United States Patent
Gerard et al.

(10) Patent No.: US 6,734,380 B2
(45) Date of Patent: May 11, 2004

(54) ADD-ON UNIT FOR CONTACTOR-CIRCUIT BREAKER

(75) Inventors: Alain Gerard, Le Perreux (FR); Jean Haudry, Vernouillet (FR); René Lecomte, Argenteuil (FR)

(73) Assignee: Schneider Electric Industries SAS (FR)

( * ) Notice: Subject to any disclaimer, the term of this patent is extended or adjusted under 35 U.S.C. 154(b) by 0 days.

(21) Appl. No.: 10/383,065

(22) Filed: Mar. 7, 2003

(65) Prior Publication Data

US 2003/0178292 A1 Sep. 25, 2003

(30) Foreign Application Priority Data

Mar. 19, 2002 (FR) .............................. 02 03526

(51) Int. Cl.[7] .......................... H01H 9/02; H01H 21/04; H01H 19/04; H01H 13/04
(52) U.S. Cl. ................. 200/307; 200/51 R; 361/93.2
(58) Field of Search ............... 200/307, 51 R, 200/51.05; 361/93.2, 93.3, 93.4, 93.9, 94

(56) References Cited

U.S. PATENT DOCUMENTS 6,184,641 B1 * 2/2001 Crimmins et al. .......... 318/466
6,262,872 B1 * 7/2001 Messerli et al. ........... 361/93.2
6,429,659 B1 * 8/2002 Marple et al. .............. 324/424

FOREIGN PATENT DOCUMENTS

| EP | 0 923 185 A1 | 6/1999 |
| FR | 2 799 572 | 4/2001 |

* cited by examiner

*Primary Examiner*—K. Lee
(74) *Attorney, Agent, or Firm*—Parkhurst & Wendel, L.L.P.

(57) ABSTRACT

An add-on unit for coupling to a main electrical appliance with separable power contacts, including a housing having a front face and a rear face, and for mounting frontally against or into such main appliance, wherein the front face includes first connections having an input-output function for connection with communication conductors for communicating with a device for control and monitoring of such main appliance, and second connections having an output function for connection with communication conductors for communicating with command input terminals of such main appliance, wherein the first connections are pins located in a connector on the front of the housing, the first connections comprising signal input connections to command such main appliance and signal output connections for signalling a status of such main appliance.

4 Claims, 3 Drawing Sheets

ADD-ON UNIT FOR CONTACTOR-CIRCUIT BREAKER

The invention herein concerns an add-on communication unit suitable to be added on to a main electrical appliance with separable power contacts, particularly a motor-starter appliance of the kind comprising an on-off control electromagnet, a device for protection against electrical faults and a manual on-off control component.

In the known appliances of this type, particularly in the one described in document WO 01/27 958, an add-on communication unit can be added. This unit comprises a housing mounted frontally onto or into the main appliance. Moreover, we know that the add-on signalling units habitually associated with the circuit-breakers comprise at least one switch component and/or an electronic processing circuit able to communicate with the main appliance via mechanical dialogue components and/or electrical connection components.

The known add-on communication units do not enable a simple way of connecting to the main appliance either a classic control cable or a bus cable—in particular specific to a field bus—, to assuring a link for signalling and control associated with the main appliance. Furthermore, they do not enable re-distributing to the main appliance the commands conveyed via such a link.

The purpose of this invention is to remedy this disadvantage.

According to the invention, the housing of the add-on unit presents, on its front face:

some first connections with an intake-output function, suitable for the connection of communication conductors, particularly bus conductors, assuring the link with an external device for controlling and monitoring the main appliance, some second connections, with an output function, suitable for the connection of conductors to link with the control input terminals of the main appliance.

The connectors for linking the add-on unit with the exterior and those for re-distributing the control signals to the main appliance are assembled on the front face of the add-on unit; the other walls of the add-on unit are thus available for other functions, namely the functions of guiding the unit into the main housing, and electrical connection and mechanical dialogue with the main appliance. The assembly formed by the main appliance plus the add-on unit can then be designed of reduced size.

The first connections can be pins assembled in a connector situated on the front of the housing of the add-on unit, and composed of input pins (with the function of commanding the main appliance) and output pins (with the function of signalling the status of the main appliance). The first connections can include supply connections, particularly for an electronic processing circuit situated in the add-on unit or a reversing component.

The second connections are advantageously three in number, two connections being allocated to the appliance on-off signal and the third connection to a signal of reversal of the operating direction of the appliance.

The add-on unit can comprise at the rear at least one switching component designed to cooperate mechanically with a leading mechanical component situated in the main appliance and whose movement reflects a change in status of that appliance.

The detailed description that follows, with reference to a method of execution given as an indication and represented by the appended drawings, will enable explaining the invention in detail.

Figure 1:
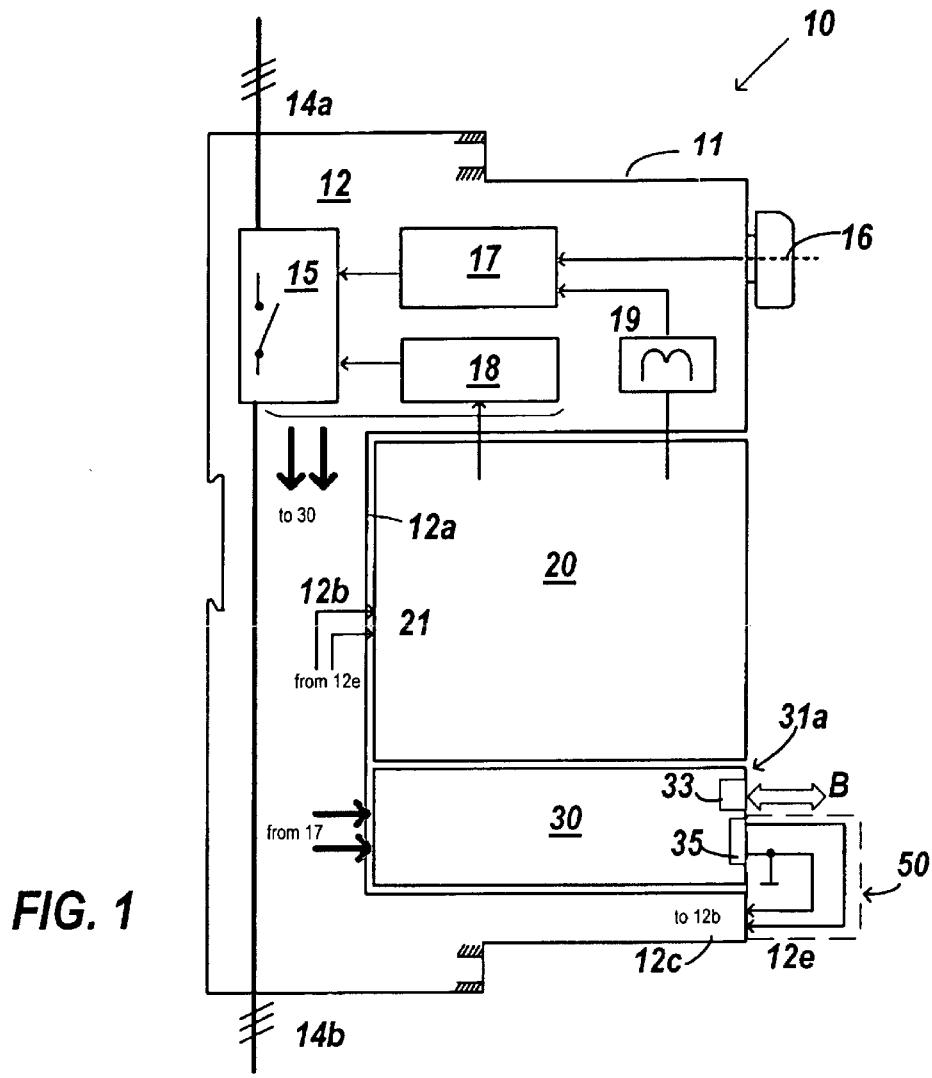
FIG. 1 is a schematic representation of a motor starter appliance equipped with the add-on unit according to the invention.
Figure 2:
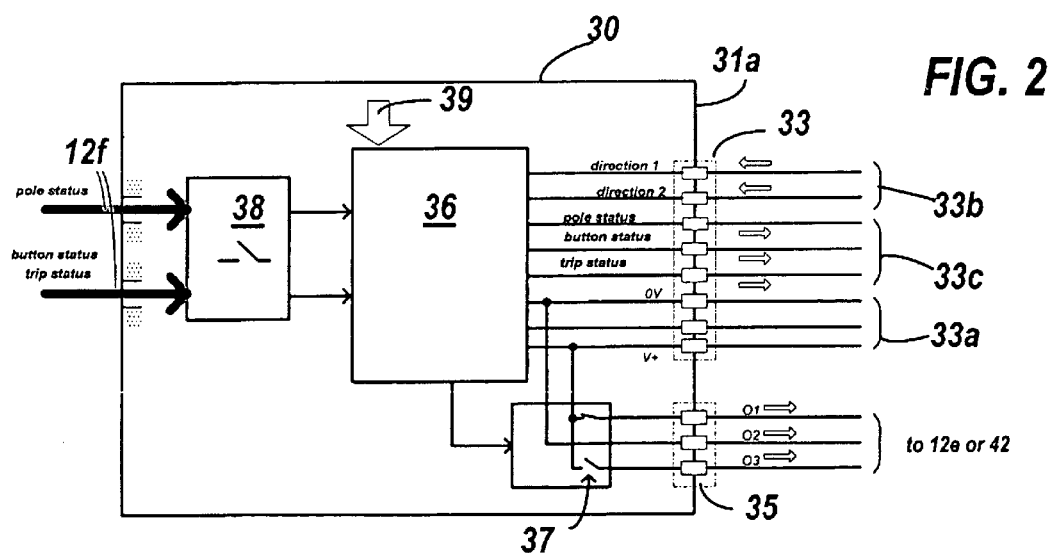
FIG. 2 is a schematic view of the same appliance, presenting a composition that enables reversal of the direction of operation of the motor.

The motor starter appliance illustrated on FIG. 1 comprises a main multi-pole appliance 10, here composed of a main housing 11 that includes a base 12 with electromechanical constituents, and an electronic unit or module 20 having a protection function, fixed to the base of the main housing in such manner as to be removable. The motor starter appliance can be differently constituted, either as a single unit or with a circuit-breaker unit plus a contactor unit.

The electromechanical base 12 comprises upstream power terminals 14a, to be linked to a power supply, and downstream power terminals 14b to be linked to a load such as a motor. Internal power lines equipped with mechanical switch poles 15 connect to terminals 14a, 14b. A manual command button 16, capable of taking at least one << on >> position and one << off >> position, acts via an opening and closing mechanism 17 on the mobile contacts of the poles 15. The mechanical links are indicated by pale arrows on FIG. 1.

The electronic protection unit 20 communicates via appropriate electrical connectors and conductors with a magnetic excess current trip switch 18 and with an electromagnet 19 for intentional on-off command, circuit-breaker 18 and the electro-magnet 19 being situated in the base 12. In particular, the protection unit 20 presents on the rear face, towards a 12a of base 12 facing forwards and hidden by the unit when it is mounted, two connections 21 for supply and control of the coil of electromagnet 19, in contact with complementary connections specifically provided on face 12a.

An add-on unit 30 of mixed electromechanical/electronic type is mounted interchangeably into a space situated below the electronic protection unit 20 and above a lower protrusion 12c of the electromechanical base 12, between vertical wings 12d of the base. It comprises a box 31 presenting a front face 31a, a rear face 31b, a top face 31c and a bottom face 31d and side faces 31e, 31f. In the event that the motor starter appliance should be executed differently from the way shown here, the add-on unit would be mounted by insertion into an appropriate housing.

Figure 3:
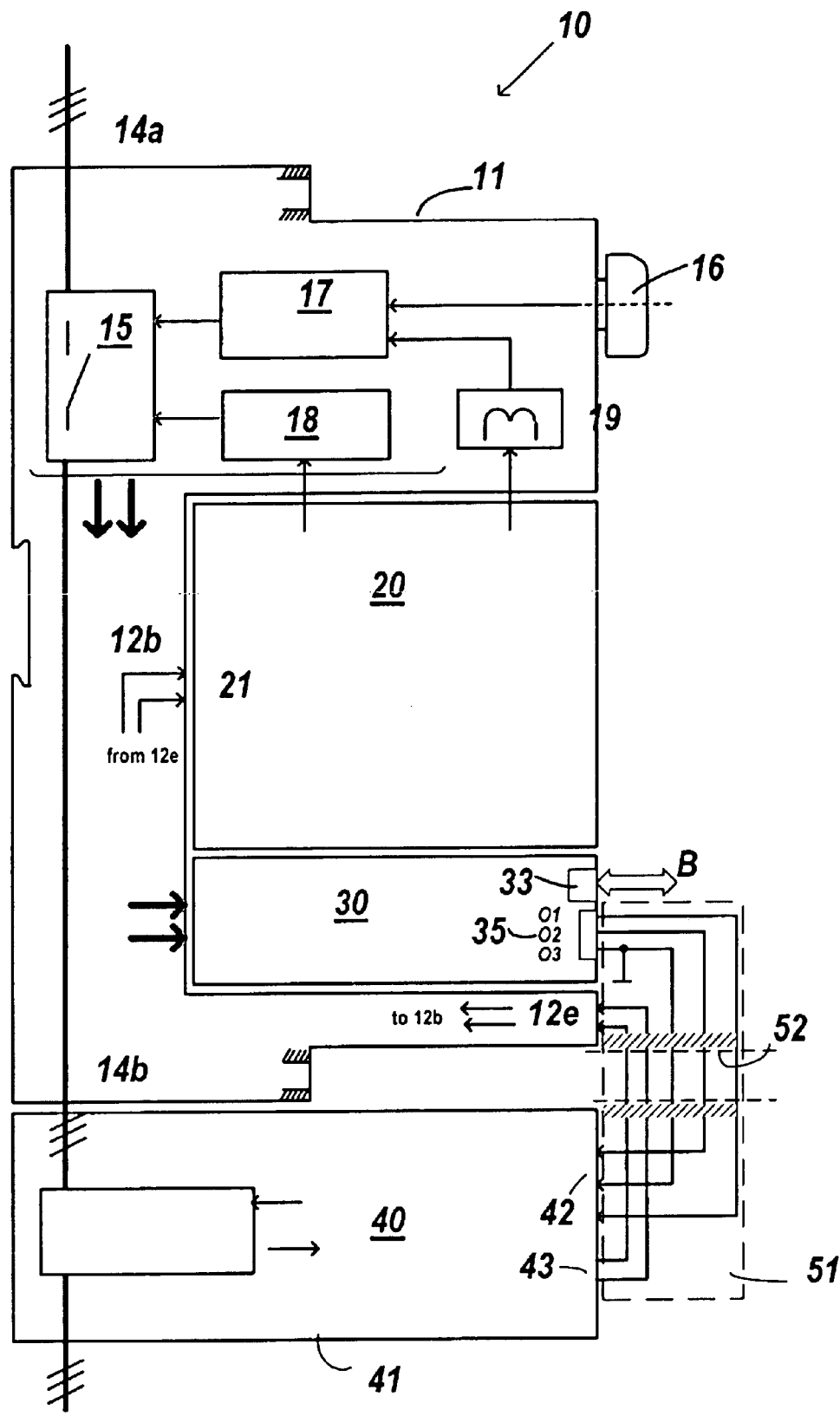
FIG. 3 is the diagram of an example of execution of an add-on unit.
Figure 4:
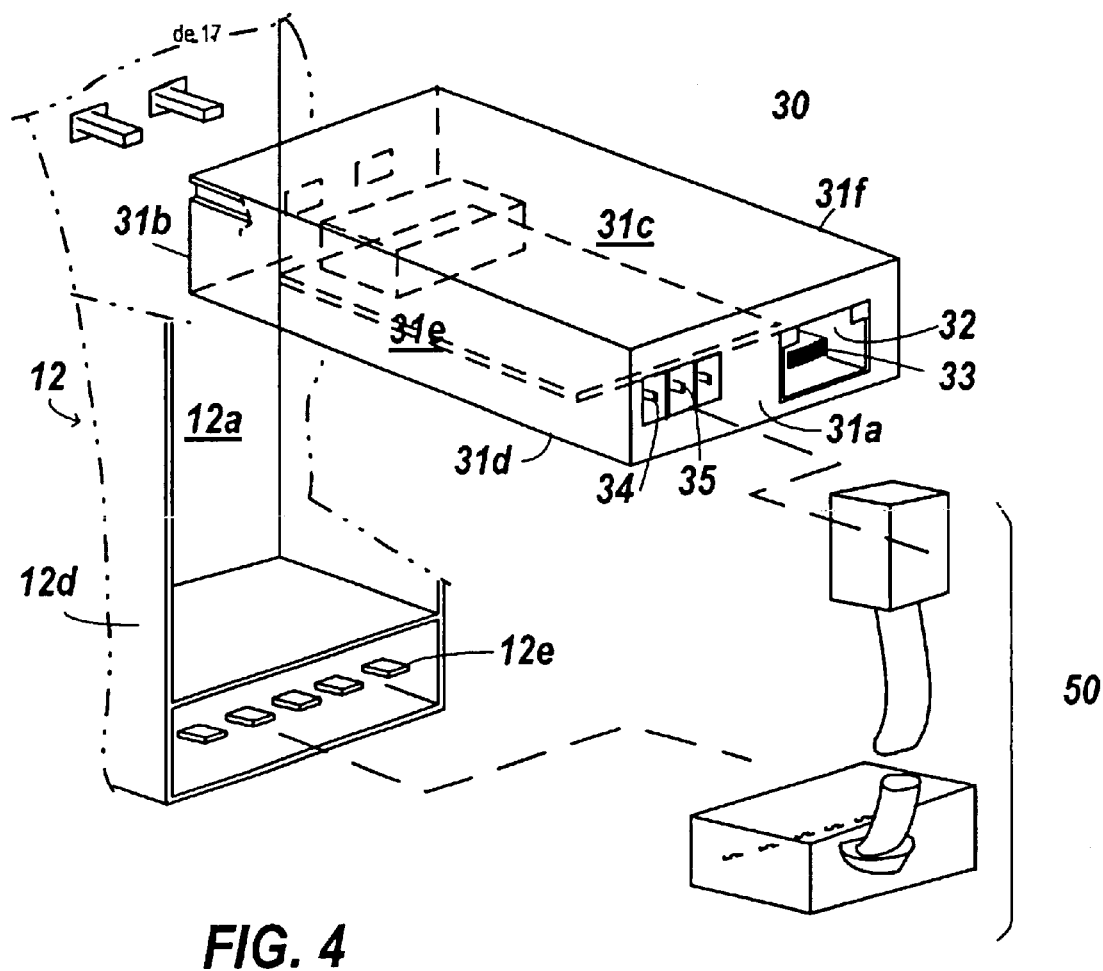
FIG. 4 shows a perspective view of an add-on unit suitable to communicate with parallel communication cables.

In front face 31a of the add-on unit 30 are provided (see FIG. 4) an opening 32 for a multipin input-output connector 33 and an opening 34 for an output connector 35 with three pins 35a designated by O1,O2,O3. Connector 33 is intended to connect to supply and external communication conductors in a bus or in a layer. It preferably comprises supply pins 33a (namely a V+ potential terminal and a 0V potential terminal), signal input pins 33b and signal output pins 33c. To pins 33b can, for instance, be applied at the input command signals determining or first or second direction of operation; to pins 33c can, for instance, be applied at the output signals significant of the status of the poles, of the status of the button, of the trip status of the appliance, etc. In the form of execution shown, connector 33 can advantageously be of type RJ45. The link between pins 35a of output connector 35 and the main appliance is performed differently depending on whether the appliance is mounted in simple mode (FIG. 1)—interconnection component 50—or in reverser mode (FIG. 3)—interconnection component 51.

To the processing circuit 36 of add-on unit 30 are associated in this unit two switches 37 situated on two conductors respectively linking a supply input pin 33a of potential V+ respectively to output pins O1 and O3. Moreover, a supply input pin 33a of potential 0V is linked to output pin O2. Two mechanical switches 38 situated in the add-on unit 30 are solicited by mechanism 17 by means of actuating fingers 12f to switch, one depending on the open or closed status of the power poles 15 of the appliance, the other depending on the status of button 16 or the trip status of the appliance. In an alternative execution, an electrical link 39 is established with protection module 20, by means of appropriate contacts between components 20 and 30, to deliver to processing circuit 36, and therefore to the bus linked to pins 33c, more sophisticated status data such as the trip intensity level, etc.

In a simple mode of manufacture, i.e., without reverser (FIG. 1), pins O1,O2, respectively to potentials V+ and 0V, are linked to input pins 12e of base 12 of the appliance, whereas pin O3 remains un-connected. The interconnection component 50 then assures the connection between output pins 35 O1,O2 of the add-on unit and input pins 12b of the appliance (see FIG. 4).

In a mode of manufacture with reverser 40 (FIG. 3), pins O1,O3 are linked to the V+ input pin by respective switches 37 assuring the energization exclusively of one or the other depending on the desired direction of operation (forward or reverse) whereas pin O2 is linked to a grounding pin of reverser 40. This latter presents a housing 41 equipped with input pins 42 to be connected to the output pins 35 O1,O2, O3 of the add-on unit and output pins 43 to be connected to the input pins 12e of base 12. As indicated in 52, the interconnection unit 51 is then fitted out to enable access for the screws of the downstream power terminals 14b of the appliance.

Figure 5:
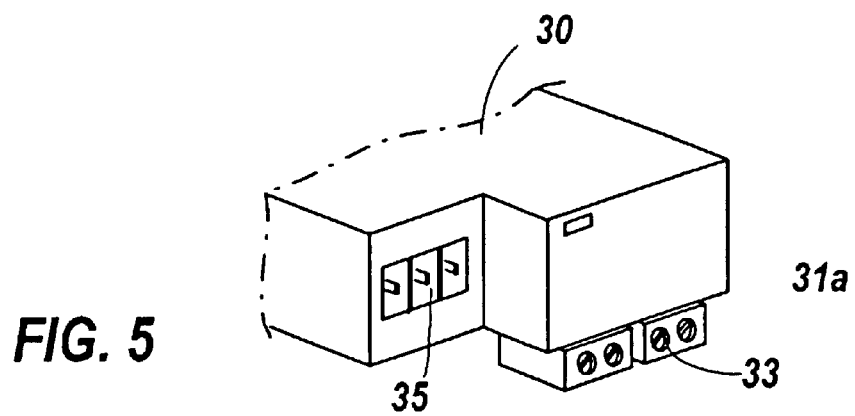
FIG. 5 shows a perspective view of a section of an add-on unit suitable to communicate with a two-wire bus.

An add-on unit enabling connection to a two-wire bus, for instance of AS-I type, is illustrated by FIG. 5.

What is claimed is:

1. An add-on for coupling to a main electrical appliance with separable power contacts, comprising:

a housing comprising a front face and a rear face, and for mounting frontally against or into such main appliance, wherein said front face comprises:
first connections having an input-output function for connection with communication conductors for communicating with a device for control and monitoring of such main appliance; and
second connections having an output function for connection with communication conductors for communicating with command input terminals of such main appliance, wherein
the first connections are pins located in a connector on the front of the housing, said first connections comprising signal input connections to command such main appliance and signal output connections for signalling a status of such main appliance.

2. The add-on unit according to claim 1, further comprising a front connector of the housing and an electronic processing circuit, wherein the first connections are located in the front connector and comprise supply connections for the electronic processing circuit.

3. The add-on unit according to claim 1, wherein the second connections comprise two connections for conducting an on-off signal and a third connection for conducting a reverse signal indicating direction of operation of such main appliance.

4. The add-on unit according to claim 1, further comprises opposite the front face at least one switching component for mechanically cooperating with a mechanical component located in such main appliance to sense movement of such mechanical component indicating a change in status of the appliance.

* * * * *